B. Van Bracklin,
Cultivator Teeth.
No. 92,910. Patented July 20, 1869.
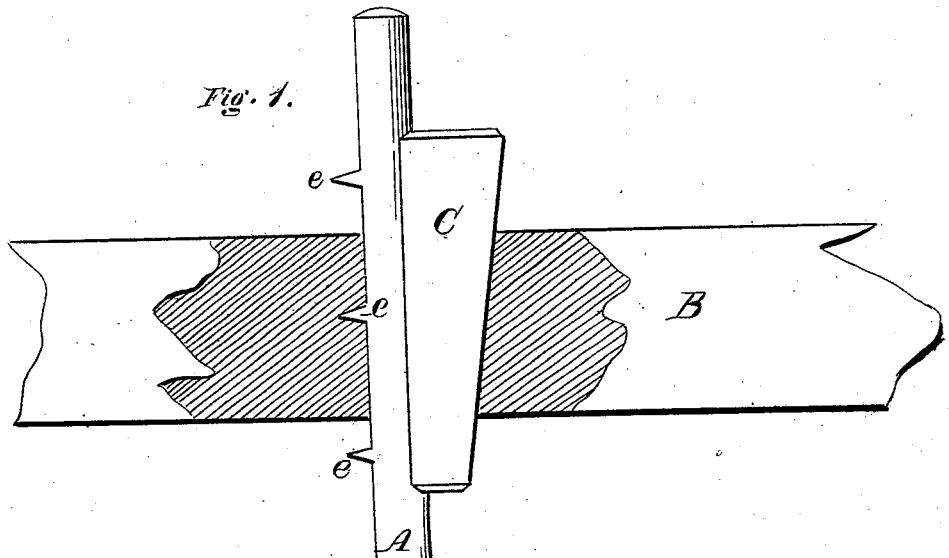
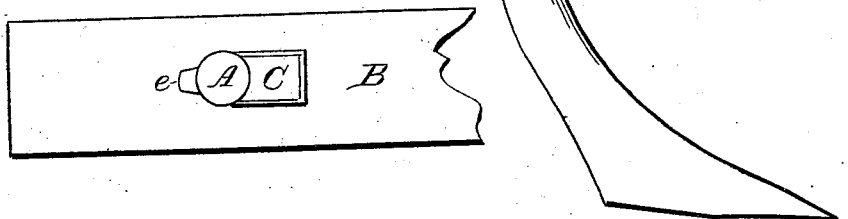

UNITED STATES PATENT OFFICE.

BENJAMIN VAN BRAEKLIN, OF LE ROY, NEW YORK.

IMPROVEMENT IN CULTIVATOR-TEETH.

Specification forming part of Letters Patent No. 92,910, dated July 20, 1869.

*To all whom it may concern:*

Be it known that I, B. VAN BRAEKLIN, of Le Roy, in the county of Jefferson and State of New York, have invented certain new and useful Improvements in Cultivator-Teeth; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to cultivator-teeth; and the invention consists in constructing the shank of the tooth with a series of spurs, by which the tooth can be adjusted laterally or vertically and secured firmly in position, as hereinafter explained.

Figure 1 is a side elevation of a tooth inserted in a beam, with a portion of the latter broken away to show the tooth. Fig. 2 is a top plan view.

Various plans have been devised from time to time for adjusting and securing the teeth of cultivators at different heights and at varying angles laterally; but such plans have generally required the use of bolts, nuts, and various other devices in addition to the tooth itself. In accomplishing these results by my plan I proceed as follows: I construct the tooth with a round shank, as represented in the drawings, and on this shank I form at proper intervals a spur, $e$, as shown clearly in Fig. 1, there being any required number of the spurs. These spurs may be formed in any suitable or convenient manner, either by welding them on or by drilling holes and screwing them in; or, as in the present case, by gouging them out of the solid metal of the shank and then forging them into the form shown. They should be so formed as to stand nearly at a right angle to the shank, as represented in Fig. 1, and should be made tapering or wedge-shaped, more or less, so as to be easily forced into the wood of the beam. Having thus made the tooth with its spurs $e$, I cut through the beam B an elongated opening or hole of proper size to permit the shank A, with its spurs $e$, to be inserted, and to have a wedge, C, also inserted in front of the shank, as represented in Figs. 1 and 2.

The operation is as follows: The tooth is inserted at the proper height and so turned as to stand at the required angle in relation to the beam, and the wedge C is then driven in on the side of the shank opposite the spurs, which forces the spur in the hole back into the wood of the beam, thereby holding the tooth firmly in place and preventing it from working up or down, and also from turning in its seat.

It is obvious that this improvement may also be applied to drag-teeth in the same manner.

I am aware that barbs have been cut on the corners of drag-teeth, hinges, &c., and that I do not claim; but,

Having thus described my invention, what I claim is—

A tooth having its shank A provided with one or more spurs, $e$, for the purpose of securing it in position, substantially as described.

BENJAMIN VAN BRAEKLIN.

Witnesses:
CHARLES E. FLINT,
ALEXR. KANADY.